A. TASSÉ.
TROLLEY WHEEL.
APPLICATION FILED FEB. 3, 1916.
1,182,512.
Patented May 9, 1916.
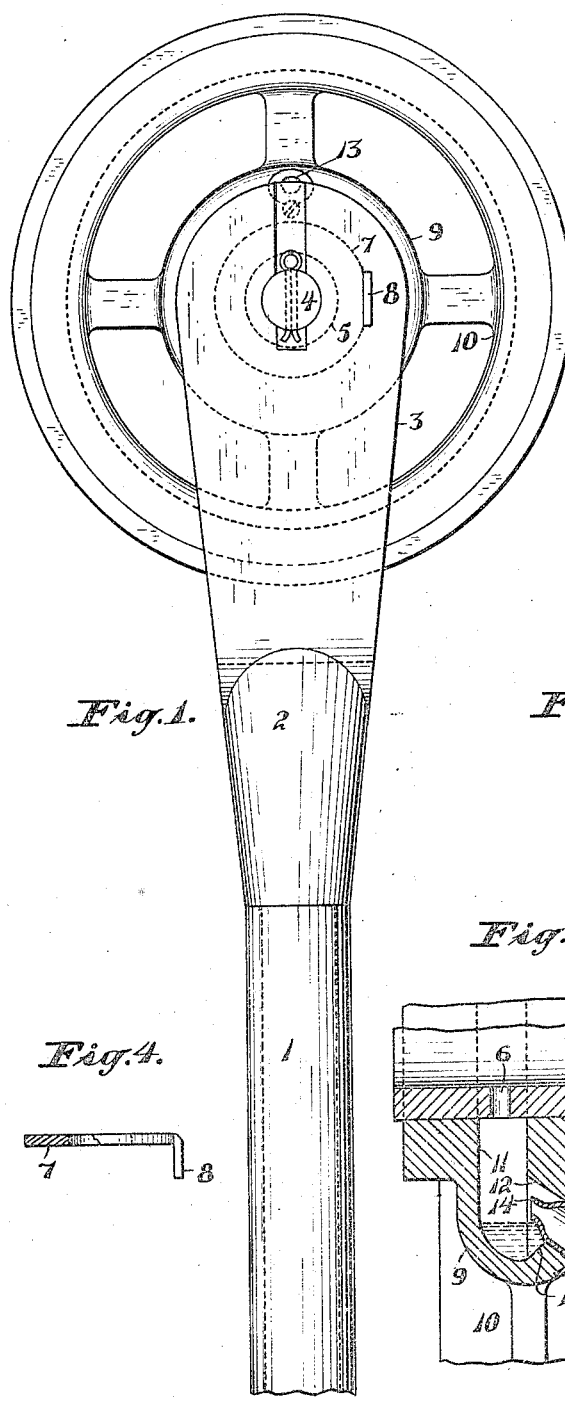
Fig.1.
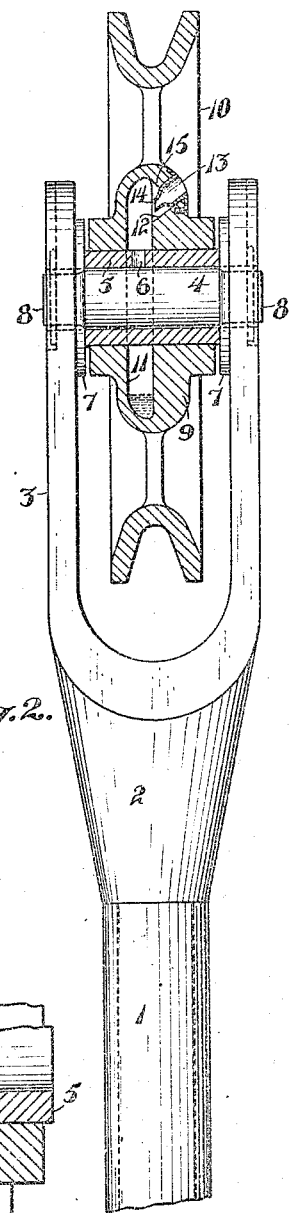
Fig.2.
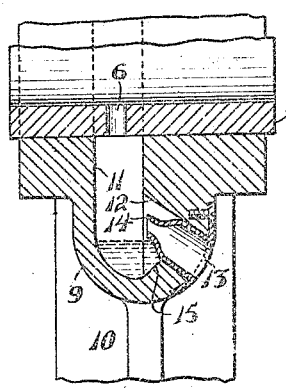
Fig.3.
Fig.4.
Inventor,
Albert Tassé,
By F.M. Wright,
Attorney

UNITED STATES PATENT OFFICE.

ALBERT TASSI, OF SAN FRANCISCO, CALIFORNIA.

TROLLEY-WHEEL.

1,182,512.  Specification of Letters Patent.  Patented May 9, 1916.

Application filed February 3, 1916. Serial No. 75,904.

*To all whom it may concern:*

Be it known that I, ALBERT TASSI, a citizen of the United States, residing at San Francisco, in the county of San Francisco and State of California, have invented new and useful Improvements in Trolley-Wheels, of which the following is a specification.

The present invention has for its object to provide a trolley wheel having improved means for oiling it.

In the accompanying drawing, Figure 1 is a side view of the trolley wheel; Fig. 2 is a front view of the trolley pole, the wheel being shown in vertical section; Fig. 3 is an enlarged view of a portion of the hub of the wheel in a position different from that shown in Fig. 2; Fig. 4 is a broken edge view of a washer.

Referring to the drawing, 1 indicates a trolley pole, and 2 a trolley carrier pivoted therein having a forked upper end 3. Upon a shaft 4 secured in said forked upper end are a bushing 5, having therethrough an oil passage 6, and a washer 7 between each bushing and the adjacent fork member, said washers being prevented from turning by keys 8 integral with the washers.

Around the bushing is the hub 9 of a trolley wheel 10. The central part of the hub is made hollow on one side, as shown at 11, to form an oil chamber, and the other side of said central part is formed with a conduit 12 extending obliquely outward and leading from said oil chamber. In said conduit is secured a short tube 13 having a tapering inner portion or nozzle 14. The conduit 12 is formed with a flaring inner end 15 and the nozzle discharges in said flaring end.

Oil is supplied to the oil chamber in such quantity that the level of the oil is never higher than as shown in Fig. 3 of the drawing. Should, however, any oil enter the flaring mouth 15 of the conduit, it will not enter the nozzle of the tube, by which tube only can it escape to the outside of the wheel.

I claim:—

A trolley wheel, the hub of which is formed with a hollow chamber and with a conduit leading from said chamber obliquely outward or away from the axis of the shaft of the trolley wheel, said conduit having a flaring inner end, and a tube fitted in the conduit, and formed at its inner end with a tapering nozzle discharging into said flaring end of the conduit.

In testimony whereof I have hereunto set my hand in the presence of two subscribing witnesses.

ALBERT TASSI.

Witnesses:
 F. M. WRIGHT,
 D. B. RICHARDS.